United States Patent
Forster

(10) Patent No.: US 11,669,707 B2
(45) Date of Patent: Jun. 6, 2023

(54) RFID TAGS USING MULTI-LAYER CONSTRUCTIONS FOR IMPROVED DURABILITY

(71) Applicant: Avery Dennison Retail Information Services, LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/225,033

(22) Filed: Dec. 19, 2018

(65) Prior Publication Data
US 2019/0205714 A1    Jul. 4, 2019

Related U.S. Application Data

(60) Provisional application No. 62/611,273, filed on Dec. 28, 2017.

(51) Int. Cl.
| | | |
|---|---|---|
| G06K 19/07 | (2006.01) | |
| H01Q 1/22 | (2006.01) | |
| G06K 7/00 | (2006.01) | |
| G06K 7/10 | (2006.01) | |

(52) U.S. Cl.
CPC ....... *G06K 19/0725* (2013.01); *G06K 7/0008* (2013.01); *G06K 7/10386* (2013.01); *H01Q 1/2225* (2013.01)

(58) Field of Classification Search
CPC ............. G06K 19/0725; G06K 7/0008; G06K 7/10386; H01Q 1/2225
USPC ........................................... 340/572.1–572.8
See application file for complete search history.

(56) References Cited

U.S. PATENT DOCUMENTS

| | | | |
|---|---|---|---|
| 7,443,362 B2 | 10/2008 | Yungers | |
| 7,570,169 B2* | 8/2009 | Li | .......................... H01Q 9/065 343/745 |
| 7,586,415 B2 | 9/2009 | Lee | |
| 8,179,264 B2 | 5/2012 | Chen et al. | |
| 9,001,001 B2 | 4/2015 | Nakano et al. | |
| 9,079,382 B2 | 7/2015 | Marttila | |
| 9,197,294 B2* | 11/2015 | Alicot | .............. G06K 19/07771 |
| 10,277,282 B2* | 4/2019 | Kilian | ..................... H01Q 11/02 |
| 2006/0176236 A1 | 8/2006 | Homolle et al. | |

(Continued)

FOREIGN PATENT DOCUMENTS

| | | |
|---|---|---|
| CN | 101228533 | 7/2008 |
| CN | 101980870 | 2/2011 |

(Continued)

OTHER PUBLICATIONS

International Preliminary Report on Patentability dated Jun. 30, 2020 issued in corresponding IA No. PCT/US2018/066361 filed Dec. 19, 2018.

(Continued)

*Primary Examiner* — Eric Blount

(57) ABSTRACT

A multi-layer conductor device is disclosed comprising two or more conductors used in an antenna for a more durable radio-frequency identification (RFID) tag. The conductors interconnect electrically, but are separated mechanically, so a failure in one conductor will not necessarily cause a failure in the other conductor. And, if the failure occurs at different locations on the antenna, the current path through the antenna will bridge the break.

17 Claims, 7 Drawing Sheets

(56) References Cited

U.S. PATENT DOCUMENTS

| | | | |
|---|---|---|---|
| 2007/0200706 A1* | 8/2007 | Lee | G06K 19/07749 340/572.7 |
| 2009/0109034 A1* | 4/2009 | Chen | G06K 19/07749 340/572.7 |
| 2013/0154885 A1* | 6/2013 | Schindler | G06K 19/077 343/700 MS |
| 2014/0361089 A1 | 12/2014 | Kai | |
| 2016/0013556 A1 | 1/2016 | Kato | |
| 2016/0064821 A1* | 3/2016 | Nakano | G06K 7/10009 343/788 |
| 2016/0189023 A1 | 6/2016 | Forster | |

FOREIGN PATENT DOCUMENTS

| | | |
|---|---|---|
| CN | 102948015 | 2/2013 |
| CN | 104160554 | 11/2014 |
| EP | 2056239 | 5/2009 |
| JP | 2002-252518 | 9/2002 |
| JP | 2012-252664 | 12/2012 |
| KR | 20070089463 | 8/2007 |
| TW | 200919327 | 5/2009 |
| WO | 2016/150537 | 9/2016 |

OTHER PUBLICATIONS

International Search Report and Written Opinion dated Mar. 29, 2019 issued in corresponding IA No. PCT/US2018/066361 filed Dec. 19, 2018.

* cited by examiner

RFID TAGS USING MULTI-LAYER CONSTRUCTIONS FOR IMPROVED DURABILITY

CROSS-REFERENCE TO RELATED APPLICATION(S)

The present application claims priority to and the benefit of U.S. provisional utility patent application No. 62/611,273 filed Dec. 28, 2017, which is incorporated by reference herein in its entirety.

BACKGROUND

The present invention relates generally to a multi-layer conductor device for a more durable radio-frequency identification ("RFID") tag. Specifically, the device makes a fault tolerant redundant antenna with diverse paths for the radio-frequency ("RF") currents to flow. The present subject matter is especially suitable for garments, uniforms, and other apparel items. Accordingly, the present specification makes specific reference thereto. However, it is to be appreciated that aspects of the present inventive subject matter are also equally amenable to other like applications.

RFID is the use of electromagnetic energy ("EM energy") to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a RF interrogation signal received from a reader, also referred to as an interrogator. In the case of passive RFID devices, the energy of the interrogation signal also provides the necessary energy to operate the RFID device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user cannot alter this serial/identification number and manufacturers guarantee that each serial number is used only once. Such read-only RFID tags typically are permanently attached to an article to be tracked and, once attached, the serial number of the tag is associated with its host article in a computer data base.

However, RFID tags incorporated into an article of clothing or other item can be exposed to heat, chemical attack, and/or mechanical forces as part of a pre-treating method and/or general cleaning method for the clothing or other item. For example, treatments such as stone washing denim, consumer washing denim, and/or industrial washing or dry cleaning can all be applied to articles of clothing and other items. Further, all of these treatments and cleaning methods can cause cracks and/or breaks in parts of the RFID tag antenna. Prior art devices act to solve this problem by making the conductor thicker, for example increasing the thickness of the conductor from 15 micro-meters to 30 micro-meters. However, once a break or fracture has started, the break will propagate through the conductor even if it is made of a thicker construction.

The present invention discloses a multi-layer conductor device comprising two or more conductors used in an antenna for a more durable RFID tag. The conductors interconnect electrically, but are separated mechanically, so a failure in one conductor will not necessarily cause a failure in the other conductor. And, if the failure occurs at different locations on the antenna, the current path through the antenna will bridge the break.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a multi-layer conductor device comprising two or more conductors used in an antenna for a more durable RFID tag. The conductors are inter-connected electrically, but separated mechanically to create a fault tolerant redundant antenna with diverse paths for the RF current to flow. Thus, a failure in one conductor will not necessarily cause a failure in the other conductor, and if the failure occurs at different locations on the antenna, the current path through the antenna will bridge the break.

In a preferred embodiment, the two or more conductors are connected together or crimped at intervals through the intervening dielectrics along the conductors. In another embodiment, the two or more conductors are connected together at intervals with a thin dielectric via capacitance. In both of these embodiments, a failure in one conductor will not necessarily cause a failure in the other conductor. Further, the current path can still operate with a failure in both conductors if the breaks occur at different points in the conductors' structures.

Additionally, the conductors can be modified to ensure that under strain the breaks in the conductors occur at different locations. Specifically, the conductors can comprise apertures at different locations, the conductors can be sandwiched together with an adhesive, or the conductors can be interconnected by a series of crimps or capacitance via a thin dielectric.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
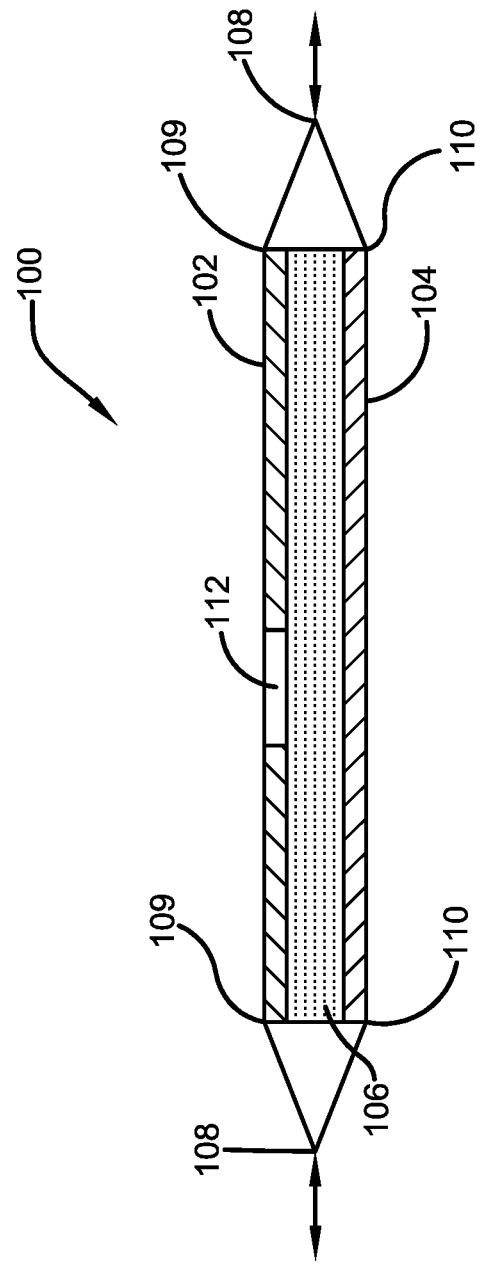
FIG. 1 illustrates a top perspective view of a multi-layer conductor device for a more durable RFID tag in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a multi-layer conductor device comprising two or more conductors used in an antenna for a more durable RFID tag. The conductors interconnect electrically, but are separated mechanically, so a failure in one conductor will not necessarily cause a failure in the other conductor. And, if the failure occurs at different locations on the antenna, the current path through the antenna will bridge the break.

Referring initially to the drawings, FIG. 1 illustrates a multi-layer conductor device 100 for a more durable RFID tag. The multi-layer conductor device 100 comprises a first conductor 102 and a second conductor 104 with a dielectric 106 positioned between the conductors 102 and 104. The conductors 102 and 104 can be any suitable conductors as are known in the art. Further, there can be any number of conductors connected together (i.e., the device is not limited to just two conductors) to create a diverse path for the current flowing through the conductors. Typically, the conductors 102 and 104 can be any suitable size, shape, and configuration as is known in the art without affecting the overall concept of the invention. One of ordinary skill in the art will appreciate that the shape and size of the conductors 102 and 104 as shown in FIG. 1 are for illustrative purposes only and many other shapes and sizes of conductors 102 and 104 are well within the scope of the present disclosure. Although dimensions of the conductors 102 and 104 (i.e., length, width, and height) are important design parameters for good performance, conductors 102 and 104 may be any shape or size that ensures optimal performance during use.

Further, the conductors 102 and 104 are connected together 108 at their respective ends 109 and 110 via any suitable means for connecting the conductors 102 and 104 to form a diverse path for current to flow along the conductors 102 and 104. Thus, if a break occurs in the first conductor 102, current can still flow along the second conductor 104 without interruption. Accordingly, as shown in FIG. 1, if a break 112 occurs in the first conductor 102, the current flows along the second conductor 104 to the point where the first and the second conductors 102 and 104 are joined 108. Thus, if the current flow is part of an antenna for an RFID tag, or part of the connection between an antenna and an RFID device, operation of the RFID tag continues at either the same or a reduced range, although the reduction in range is less than would be the case if the diverse paths were not available.

Figure 2A:
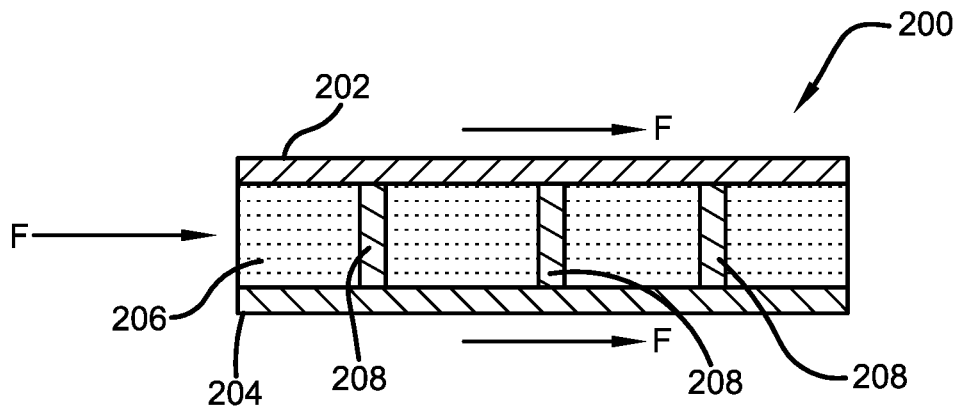
FIG. 2A illustrates a top perspective view of an alternative structure of the multi-layer conductor device wherein connections between the conductors are made at intervals along the conductors in accordance with the disclosed architecture.

In another embodiment as shown in FIG. 2A, a multi-layer conductor device 200 is disclosed comprising a first conductor 202 and a second conductor 204 with at least one dielectric 206 positioned between the conductors 202 and 204. Further, the first 202 and second 204 conductors are connected together at intervals along the conductors 202 and 204. These connections 208 between the conductors 202 and 204 through the intervening dielectrics 206 can be made by any suitable means as is known in the art, such as crimping, welding, or creating holes in the conductors with the inside walls coated with a fabric. Within this application, such connections are referred to as 'crimps' 208. As there are connections/crimps 208 at many points between conductors 202, 204, it is not required to make connections to both conductors 202 and 204 at all times. For example, when the conductors 202 and 204 are part of an RFID tag antenna, it maybe that the RFID device is directly connected to the first conductor 202, and the connection to the second conductor 204 is made by a crimp 208 adjacent to the RFID device.

Figure 2B:
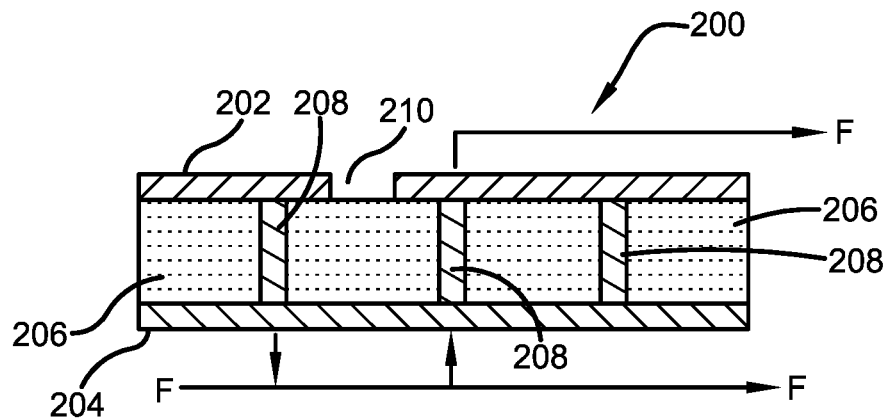
FIG. 2B illustrates a top perspective view of the conductors connected via crimps and a single break in one of the conductors in accordance with the disclosed architecture.

Additionally, as shown in FIG. 2B, the multi-layer conductor device 200 is shown with a single break 210 in the first conductor 202. However, since the multi-layer conductor device 200 comprises multiple connections/crimps 208, the current F flows along the conductors 202 and 204 is not interrupted. Specifically, FIG. 2B illustrates how the current F follows a path involving crimps 208 that bypasses the break 210 in the first conductor 202, allowing current to flow to the second conductor 204, and thus allowing operation of the RFID tag.

Figure 2C:
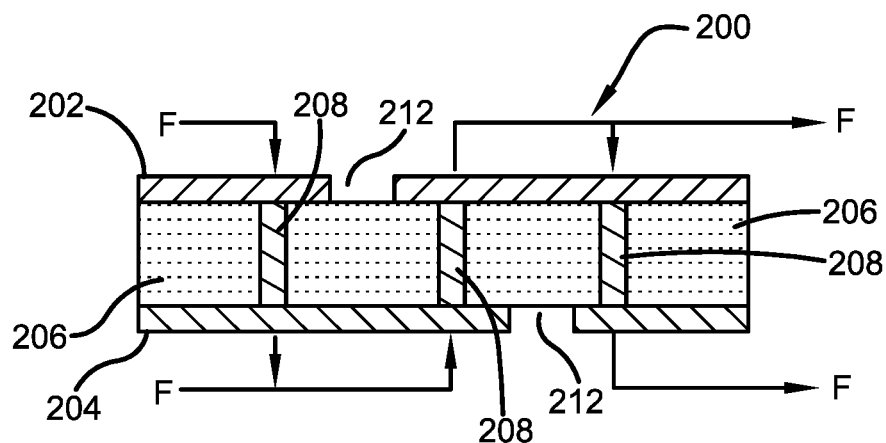
FIG. 2C illustrates a top perspective view of the conductors connected via crimps and multiple breaks in the conductors at different points in accordance with the disclosed architecture.

As shown in FIG. 2C, the multi-layer conductor device 200 is shown with breaks 212 in both the first and the second conductors 202 and 204. However, since the multi-layer conductor device 200 comprises multiple crimps 208, the current F flow along the conductors 202 and 204 is not interrupted. Specifically, FIG. 2C illustrates how the current F follows a path involving crimps 208 that bypasses the breaks 212 in the first and the second conductors 202 and 204, allowing operation of the RFID tag.

Figure 3A:
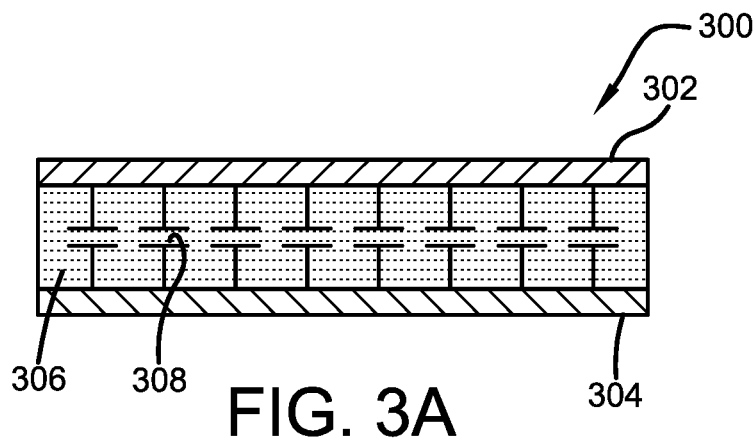
FIG. 3A illustrates a top perspective view of an alternative structure of the multi-layer conductor device wherein the conductors are coupled with a thin dielectric via capacitance in accordance with the disclosed architecture.

In an alternative embodiment shown in FIG. 3A, a multi-layer conductor device 300 is disclosed comprising a first conductor 302 and a second conductor 304 coupled together via a thin dielectric 306. The thin dielectric 306 can be any suitable dielectric as is known in the art. Further, the conductors 302 and 304 are coupled with the thin dielectric 306 via capacitance. Although FIG. 3A illustrates a sequence of discrete capacitors 308, the capacitance for the multi-layer conductor device 300 is not restricted to specific locations, but includes any suitable placement and amount of capacitors 308 as is known in the art.

Figure 3B:
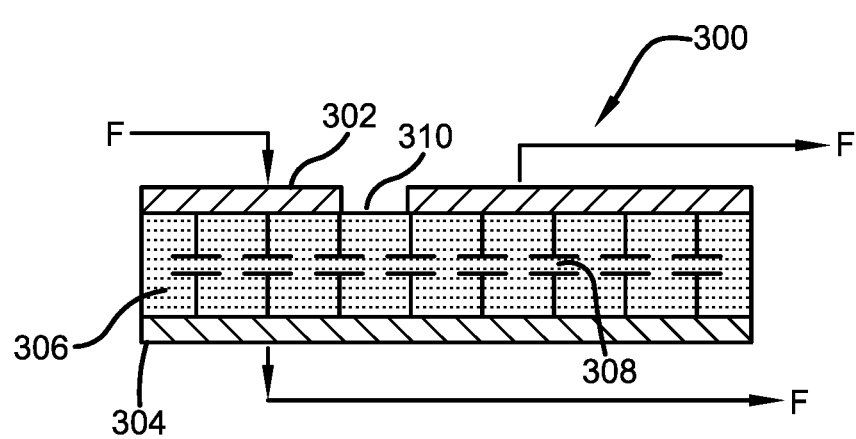
FIG. 3B illustrates a top perspective view of the conductors connected via capacitors and a single break in one of the conductors in accordance with the disclosed architecture.

Additionally, as shown in FIG. 3B, the multi-layer conductor device 300 is shown with a single break 310 in the first conductor 302. However, since the multi-layer conductor device 300 comprises multiple coupling with capacitors 308, the current F flow along the conductors 302 and 304 is not interrupted. Specifically, FIG. 3B illustrates how the current F follows a path via the distributed inter-layer capacitance 308 to bridge the gap caused by the break 310 in the first conductor 302, allowing current F to continue to flow through the conductors 302 and 304 and allowing operation of the RFID tag.

Figure 3C:
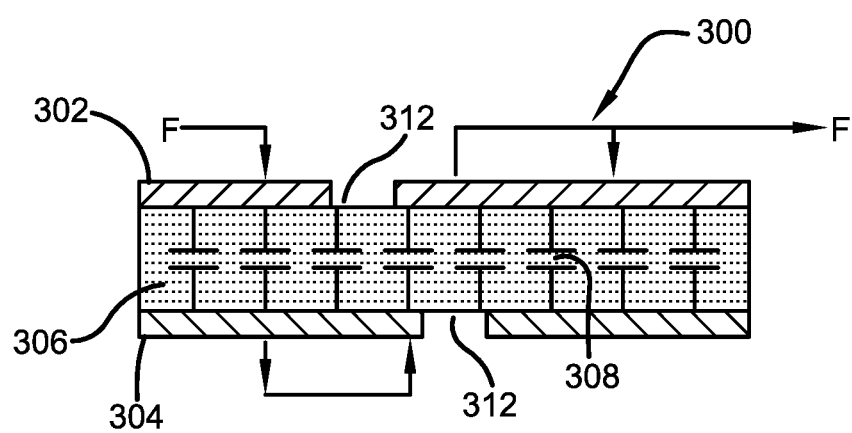
FIG. 3C illustrates a top perspective view of the conductors connected via capacitors and multiple breaks in the conductors at different points in accordance with the disclosed architecture.

As shown in FIG. 3C, the multi-layer conductor device 300 is shown with breaks 312 in both the first and the second conductors 302 and 304. However, since the multi-layer conductor device 300 comprises multiple coupling with capacitors 308, the current F flow along the conductors 302 and 304 is not interrupted. Specifically, FIG. 3C illustrates how the current F follows a path via the distributed inter-layer capacitance 308 to bridge the gaps caused by the breaks 312 in the conductors 302 and 304, allowing current to continue to flow through the conductors 302 and 304 and allowing operation of the RFID tag.

All of the above-disclosed multi-layer conductor devices optimally perform when the breaks (or failures) occur at different points along the conductors. Therefore, to ensure that the breaks occur at different points along the conductors, modifications can be made to the conductors. These modifications ensure that, under strain, bending, etc., the breaks will occur at different locations, and the RFID tag will continue to function.

Figure 4:
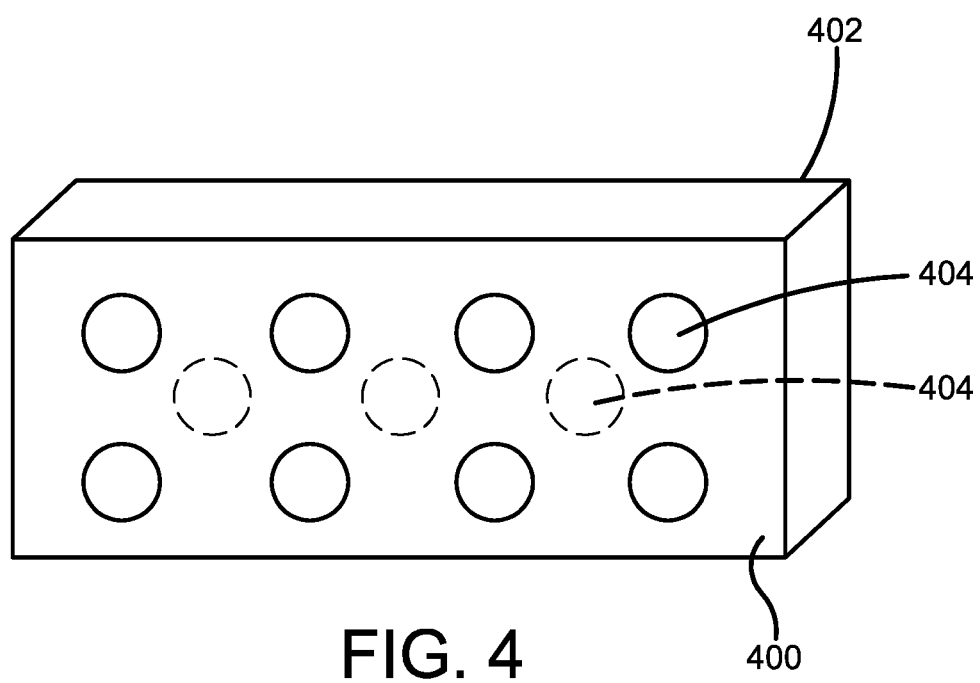
FIG. 4 illustrates a top perspective view of an alternative structure of the multi-layer conductor device wherein the conductors have apertures in them at different locations in accordance with the disclosed architecture.

One embodiment of the present invention, as shown in FIG. 4, discloses the conductors 400 and 402 as having apertures 404 or voids or holes made in them, at different locations on the top and bottom conductors 400 and 402. Other suitable methods of modifying the conductors 400 and 402 can be used, such as embossing or perforating the conductors 400 and 402 or any other suitable methods as is known in the art. Accordingly, breaks in the conductors 400 and 402 will tend to occur between apertures 404, and as the apertures 404 are in different locations, the breaks are unlikely to be in the same place, allowing the bridging strategies disclosed in FIGS. 2-3 to be more effective.

Figure 5A:
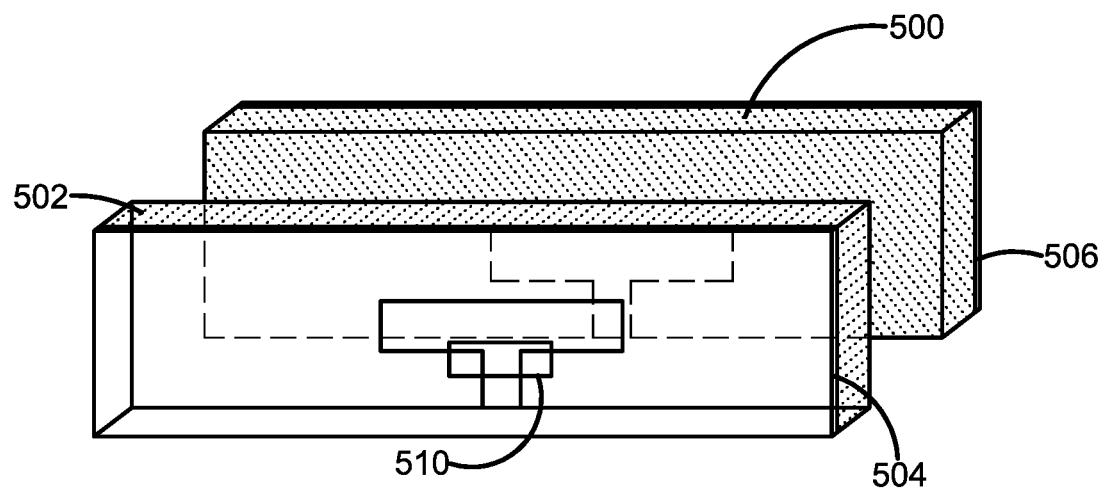
FIG. 5A illustrates a side perspective view of the multi-layer conductor device wherein an adhesive and an RFID strap are positioned between two antennas/conductors in accordance with the disclosed architecture.
Figure 5B:
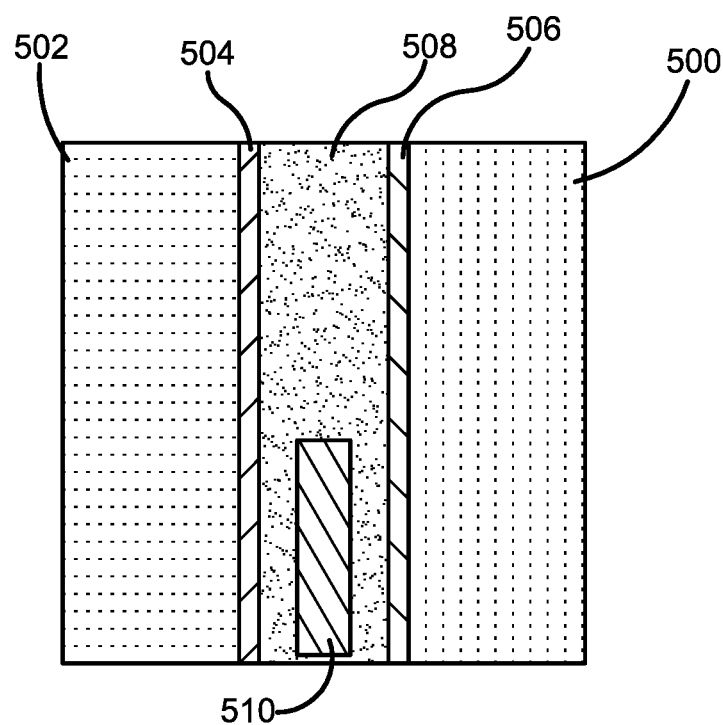
FIG. 5B illustrates a top perspective view of the multi-layer conductor device wherein the adhesive and the RFID strap are positioned between two antennas/conductors in accordance with the disclosed architecture.

In an alternative embodiment shown in FIGS. 5A-B, two copies of the conductive pattern of the antenna/conductor 504 and 506 are sandwiched together with an adhesive 508 or other suitable material as is known in the art between them. The two copies of the conductive pattern of the antenna 504 and 506 are then positioned between dielectric layers 500 and 502 or other layers of suitable material. And, an RFID strap/interposer 510 is placed in the adhesive layer 508, coupling via either capacitance or a crimp to both copies of the antenna 504 and 506. The nature of the material (layers) which is coupling the two antenna/conductors 504 and 506 together can aid in protecting the device. For example, if the material is an elastic material, the mechanical stress from one layer is decoupled from the other layer when bending or pulling the device, and therefore the probability of a simultaneous failure in both antennas 504 and 506 at a common point is highly unlikely. Further, by being sandwiched between two antennas 504 and 506, the RFID strap 510 is well protected from damage induced by washing, wearing, etc.

Figure 6:
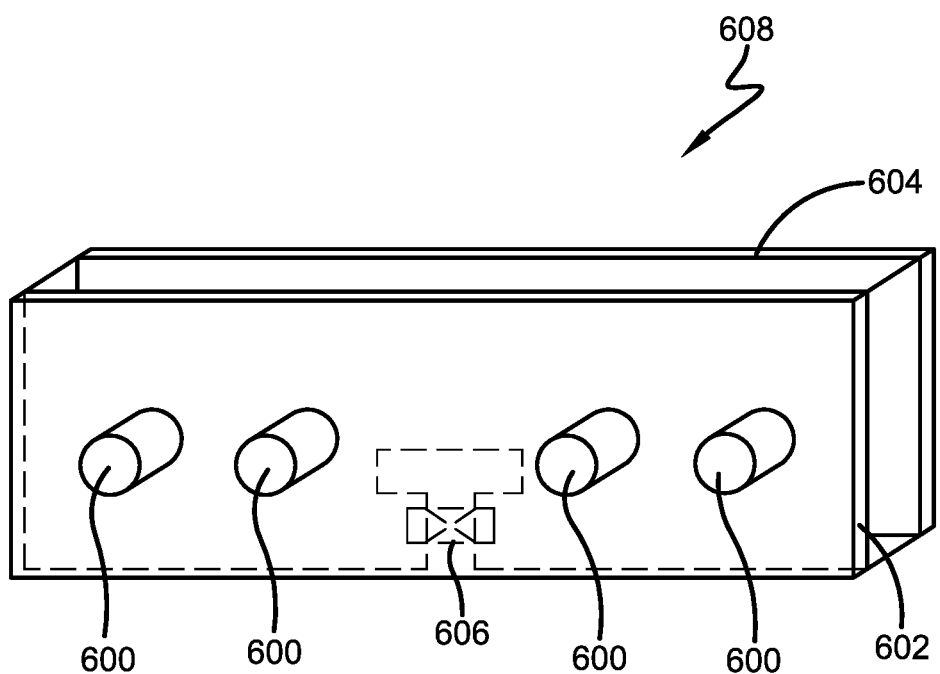
FIG. 6 illustrates a top perspective view of the multi-layer conductor device wherein crimps or welds between the conductors provide mechanical protection for the RFID strap in accordance with the disclosed architecture.

FIG. 6 illustrates another embodiment wherein additional crimps or welds 600 between the conductors (antennas) 602 and 604 provide both mechanical protection and conductive path diversity for an RFID strap 606 being used as a part of an RFID tag 608. Specifically, the RFID strap 606 is positioned between the two conductors 602 and 604. The conductors 602 and 604 are then interconnected via the additional crimps or welds 600 to mechanically protect the RFID strap 606.

Figure 7:
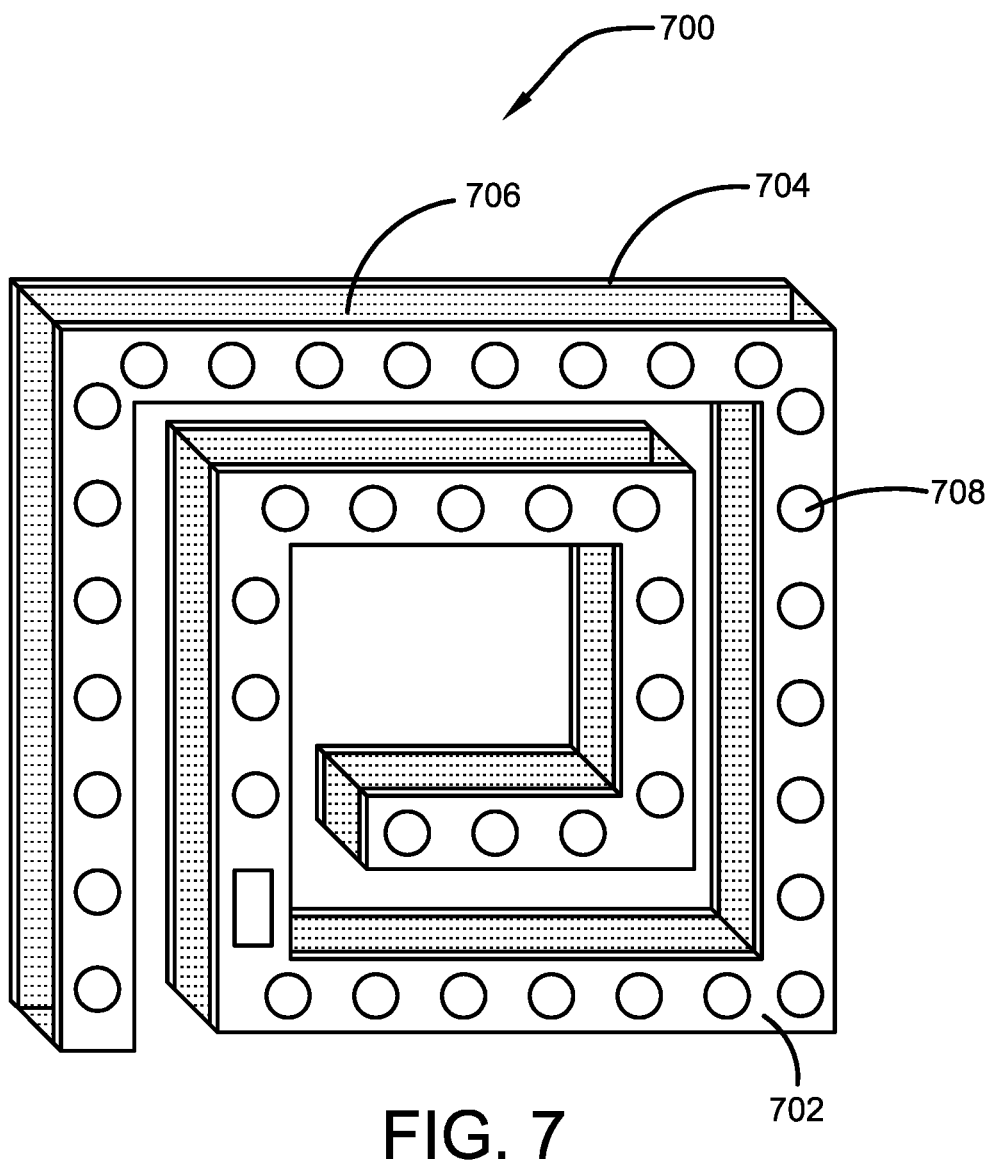
FIG. 7 illustrates a top perspective view of a multi-layer conductor device for a high frequency (HF) RFID tag with a coil antenna in accordance with the disclosed architecture.

FIG. 7 illustrates another embodiment of the present invention where a high frequency (HF) RFID tag 700 is utilized. Here, two conductors (or coil antennas) 702 and 704 in the same pattern are provided on either side of a dielectric 706. The dielectric 706 acts as a mechanical separator. The coil antennas 702 and 704 are then interconnected by a series of crimps 708 along the conductive traces of the loop, therefore breaks in the conductors (coil antennas) 702 and 704, as before, can be bridged. Another advantage is that the overall resistance of the coil antennas 702 and 704 is reduced. Furthermore, although the structure has been shown with crimps 708 between the top and bottom of the conductors 702 and 704, capacitance via a thin dielectric can be used as well.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multi-layer conductor device for a more durable radio-frequency identification tag, comprising:
   a first conductor;
   a second conductor electronically connected to the first conductor at a pair of connection points; and
   a dielectric positioned between the first and the second conductors, wherein one or more capacitors are positioned between the first and the second conductors at intervals along the first and second conductors between the pair of connection points to form a diverse path that maintains current between the connection points after at least one break appears in the first conductor.

2. The multi-layer conductor device of claim 1, wherein the first and the second conductors are connected together by the dielectric.

3. The multi-layer conductor device of claim 1, wherein the first and the second conductors are connected together via at least one of crimping, welding, or creating holes in the first and second conductors.

4. The multi-layer conductor device of claim 1, wherein the first and the second conductors are connected together with a thin dielectric via capacitance.

5. The multi-layer conductor device of claim 1, wherein each of the first and the second conductors comprise at least one aperture.

6. The multi-layer conductor device of claim 1 further comprising an adhesive positioned between the first and the second conductors.

7. The multi-layer conductor device of claim 1 further comprising a RFID strap positioned between the first and second conductors.

8. The multi-layer conductor device of claim 7 further comprising crimps between the first and the second conductors which protect the RFID strap.

9. A multi-layer conductor device for a more durable radio-frequency identification tag comprising:
   a first conductor;
   a second conductor electrically connected to the first conductor at a pair of connection points; and
   an intervening dielectric positioned between the first and the second conductors, wherein one or more capacitors are positioned between the first and the second conductors at multiple intervals along the first and the second conductors between the pair of connection points to form a diverse path the maintains current between the connection points after at least one break appears in the first conductor.

10. The multi-layer conductor device of claim 9, wherein each of the first and the second conductors comprise apertures at different locations along the first and the second conductors.

11. The multi-layer conductor device of claim 9, wherein the first and the second conductors comprise two antennas positioned between the first and the second conductors.

12. The multi-layer conductor device of claim 11, wherein the two antennas comprise an RFID strap sandwiched between the two antennas.

13. The multi-layer conductor device of claim 12, further comprising crimps between the first and the second conductors which protect the RFID strap from damage.

14. A multi-layer conductor device for a more durable radio-frequency identification tag comprising:
   a first conductor; and
   a second conductor electrically connected to the first conductor at a pair of connection points,
   wherein the first and the second conductors are connected together by a thin dielectric via capacitance,
   wherein the first and the second conductors are interconnected by a series of crimps along the first and the second conductors between the pair of connection points, and
   wherein a plurality of capacitors are positioned along each of the first and the second conductors to form a diverse path that maintains current between the connection points after at least one break appears in the first conductor.

15. The multi-layer conductor device of claim 14, wherein each of the first and the second conductors comprise apertures at different locations along the first and the second conductors.

16. The multi-layer conductor device of claim 14, wherein the RFID tag is a high frequency (HF) RFID tag with a coil antenna.

17. The multi-layer conductor device of claim 16, wherein each of the first and the second conductors comprise a pattern substantially similar to the coil antenna and are positioned on either side of the thin dielectric.

* * * * *